United States Patent [19]

Whitaker

[11] Patent Number: 4,615,377
[45] Date of Patent: Oct. 7, 1986

[54] METHOD OF STRIPING HOT STEEL SLABS
[75] Inventor: Eugene Whitaker, Granite City, Ill.
[73] Assignee: National Steel Corporation, Pittsburgh, Pa.
[21] Appl. No.: 678,595
[22] Filed: Dec. 5, 1984
[51] Int. Cl.⁴ .............................................. B23K 7/06
[52] U.S. Cl. .................... 164/477; 148/9 R; 266/51
[58] Field of Search ...................... 164/477, 460, 263; 266/48, 51; 148/9 R; 356/43

[56] References Cited

U.S. PATENT DOCUMENTS

| | | | |
|---|---|---|---|
| 4,131,490 | 12/1978 | Oishi et al. | 148/9.5 |
| 4,243,436 | 1/1981 | Engel | 266/51 |
| 4,318,439 | 3/1982 | Hiroshima et al. | 164/154 |
| 4,336,923 | 6/1982 | Shiraiwa et al. | 266/51 |
| 4,337,099 | 6/1982 | Hiroshima et al. | 148/9.5 |

FOREIGN PATENT DOCUMENTS 174275 10/1984 Japan .

OTHER PUBLICATIONS

"High Speed Optical Pyrometer" by G. M. Foley printed in The Review of Scientific Instruments, Jun. 1970.

Primary Examiner—Nicholas P. Godici
Assistant Examiner—G. M. Reid
Attorney, Agent, or Firm—O'Neil and Bean

[57] ABSTRACT

An improved method of and apparatus for striping hot steel slabs on the runout table of a continuous caster employs a torch support and drive mechanism adapted to support a scarfing torch for movement at a uniform rate across the surface of a slab maintained in a stationary position on the runout table. A radiation thermometer supported for movement with the torch is focused to continuously monitor the striping operation by detecting flashes or temperature increases resulting from reduction of alumina inclusions during the striping process and transmitting an electrical signal to a microprocessor which converts the signal to electrical impulses that are counted, recorded or otherwise utilized to evaluate the slab being striped. The microprocessor controls operation of the apparatus during the striping process to provide a more reliable evaluation of the slab.

3 Claims, 5 Drawing Figures

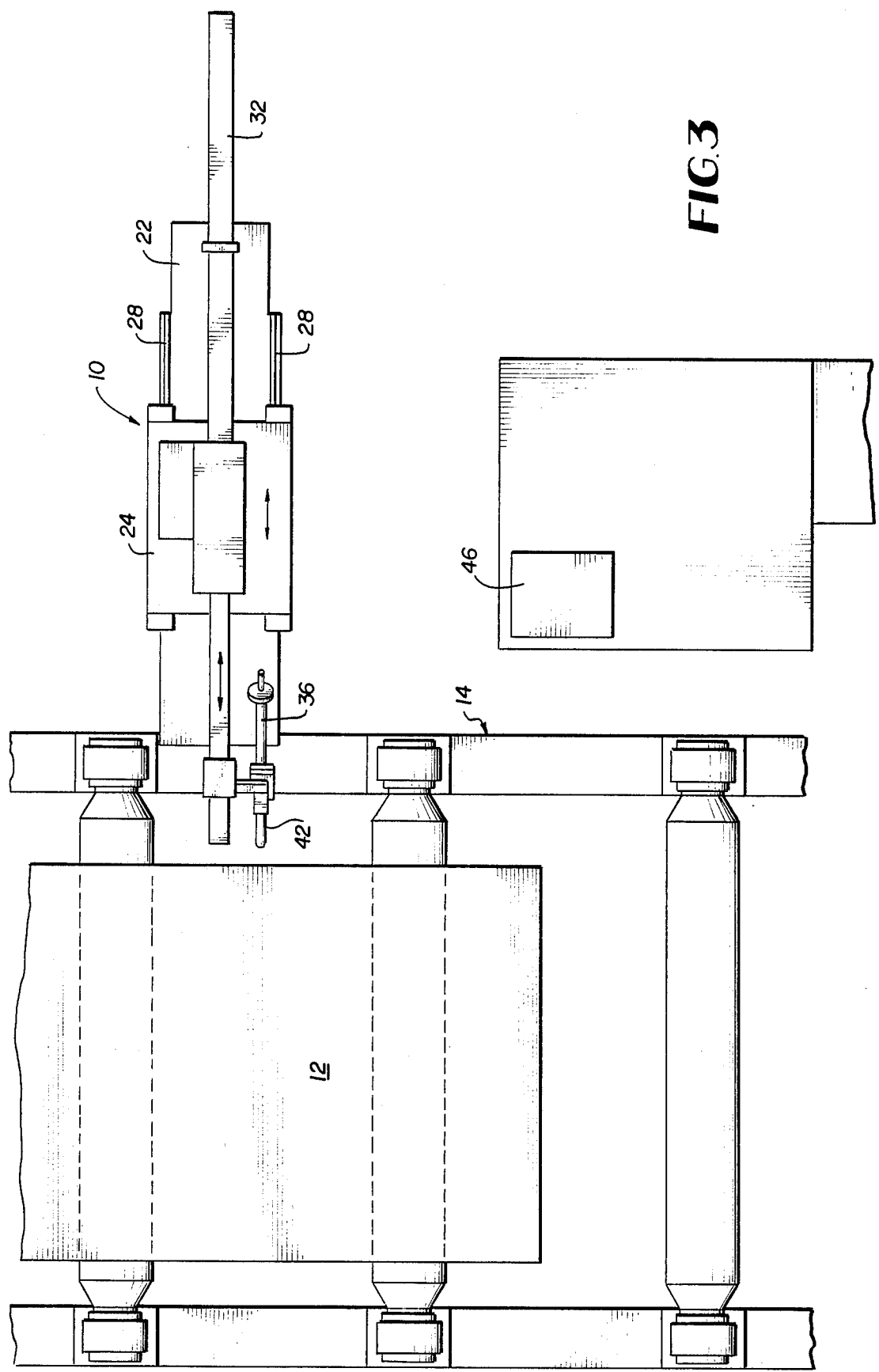

METHOD OF STRIPING HOT STEEL SLABS

BACKGROUND OF THE INVENTION

1. Field of the Invention

This invention relates to striping steel slabs and ingots for the detection of inclusions, and more particularly to an improved method of and apparatus for automatically striping a hot steel slab produced in a continuous caster.

2. Description of the Prior Art

In the production of steel by a continuous casting process, the continuously cast strand is conventionally cut into slabs of predetermined length on the horizontal runout table. The individual slabs, after being weighed and marked for identification, are moved from the runout table to a storage area where they are permitted to air cool to a temperature which will enable personnel to walk over and inspect them. Depending on their size and cooling conditions, individual slabs may have to be retained in the storage area for from 18 to 36 hours after casting. Inspection is necessary to determine the extent, if any, of scarfing which may be required before further processed as by rolling, or whether a portion or all of an individual slab may have to be removed as scrap.

One inspection procedure known as striping involves a technique of using an oxygen-gas torch for scarfing a thin stripe across the top surface of the slab to evaluate the quantity and depth of alumina inclusions adjacent the surface. As is known, the outer or skin layer of a cast slab consists primarily of scale which is removed during subsequent reheating and rolling processes. The initial pass of the striping torch removes this outer skin layer in a path which may be approximately three inches wide and extend across the full width of the slab.

As the striping torch is moved along the slab surface, a molten puddle of metal moves ahead of the torch. When this molten metal comes into contact with an alumina inclusion, a visible flash is produced as the alumina particle is rapidly reduced.

In the prior art method of striping, an operator stands on the slab and moves the striping torch across its cooled surface. The torch is clamped and supported for movement on a wheeled dolly which the operator rolls along the top of the slab while observing, counting and evaluating the flashes. Alternatively, the operator may rest the torch directly on the slab and hold it at the desired angle while manually sliding it across the surface to be striped. After the torch has traversed the slab to remove the outer skin layer, the operator moves back to the starting point and makes a second pass with the torch in the same path to scarf a second thin layer of metal from the slab. In this process, the human element involves not only the ability to control movement of the torch while observing and counting the flashes, but also the ability to remember and compare the flashes on the two passes of the torch required for each stripe.

As indicated above, the material in the outer skin layer is normally removed as scale during subsequent reheating and rolling processes. The flashes in the subsurface layer, however, may indicate the necessity for subsequent scarfing of the slab surface to remove excessive alumina inclusions which, if not removed, will show up as streaks or slivers in the surface of the steel following subsequent rolling. The removal of excessive alumina becomes more critical as steel is rolled into strip of thinner gauges. Thus, accurate counting of the flashes becomes important if the striping procedure is to be considered a reliable indication of the necessity of subsequent treatment processes such as scarfing. A comparison of the flashes observed in the first and second passes of the striping torch has been determined to be a reliable indication of the depth of inclusions which might be expected.

The prior art procedure of cooling slabs before striping is undesirable not only because of the substantial storage space required and the time and cost involved in moving the slabs to and from storage but also because much of the heat lost during cooling must be restored before subsequent rolling operations. Thus, if it can be determined that the alumina inclusions are such that scarfing will not be necessary, a slab can be moved directly from the caster runout table to the next processing step with little or no reheating required. At the same time, if the inclusions are such that scarfing is required, the slab can be sent directly to the scarfing area for processing and then transferred to the next process step. Accordingly, the primary object of the present invention is to provide an improved method and apparatus for automatically striping steel slabs without requiring an operator present on the slab to observe the torch flame during the striping process.

Another object is to provide such a method and apparatus for striping a steel slab before it has cooled following the casting process.

Another object is to provide such a method and apparatus for striping a hot steel slab on the runout table of a continuous caster at a location downstream from the slab cut-off machine.

Another object is to provide an apparatus for and method of automatically striping a hot steel slab.

Another object is to provide such an apparatus which will automatically manipulate a striping torch, optically detect and count flashes representing alumina inclusions, and provide a readout of the striping process at a station remote from the striping torch.

SUMMARY OF THE INVENTION

In the attainment of the foregoing and other objects and advantages of the invention, an important feature resides in providing a hot slab striping machine at a location adjacent one side of the continuous caster runout table downstream from the slab cut-off machine, with the striping machine being operable, once actuated, to complete the striping operation without requiring the presence of an operator to manipulate the torch or to observe the striping operation to count, compare and evaluate alumina flashes. The striping machine includes a telescoping arm and drive mechanism adapted to be projected transversely across the runout table, and a striping torch is mounted on the arm for movement therewith to traverse a predetermined path across the surface of a hot slab on the runout table. An optical pyrometer, or radiation thermometer, is also carried by the telescoping arm and is focused on a point near the leading edge of the molten metal which moves ahead of the striping torch flame during a striping pass.

When a hot slab is in position for striping on the runout table, an operator will initiate the striping sequence which is thereafter automatically controlled by a microprocessor controller. Upon initial actuation, the telescoping arm is advanced from a parked position at one side of the slab, with the torch supported at the desired level relative to the top surface of the slab. A stop member carried by the arm accurately locates the torch relative to the edge of the slab. Preheat gases supplied to the torch initially heat the slab surface for a predetermined time after which oxygen is supplied to the torch and a drive mechanism is actuated to advance the torch at a predetermined rate across the surface of the slab. When the torch traverses the full width of the slab, oxygen is turned off and the torch is retracted to a position near the starting point and the procedure is repeated to scarf a second thin layer from the same path to complete a single stripe across the slab.

Upon completion of the second striping pass, the oxygen is turned off and the mechanism withdrawn to the parked position. During each striping pass of the torch, the optical pyrometer continuously monitors the process to detect any flashes caused by an alumina inclusion being reduced by the molten metal. The optical pyrometer transmits an output voltage signal to the microprocessor which converts the signal to an electric impulse representing an inclusion, and these impulses are counted and displayed on a digital readout at the operator's station. At the same time, record of the flashes is stored for comparison of the two passes and the record may be permanently stored as a part of the slab history or transmitted to other processor control equipment for future use.

In a striping operation, there is a tendency for the torch to produce a slight gouge at the beginning of each striping pass when scarfing oxygen is turned on following preheating. In accordance with the present invention, adverse effects of this tendency are avoided by initiating the two striping passes at a slightly different point. Thus, the torch support apparatus is controlled to position the tip of the torch a short distance, for example, approximately two inches, from the edge of the slab top surface at the beginning of the first striping pass. When the torch is retracted following completion of the first pass, it is positioned closer to the edge of the slab whereby any starting gouge formed at the beginning of each pass is located at a different position and a substantially smooth surface is produced throughout the completed stripe across the width of the slab.

In order to enable the hot slab to be stationary during striping, the striping machine is located downstream from the cut-off machine a distance which will enable a slab, after being cut off from the continuously cast strand, to be accelerated and advanced ahead of the following slab, then stopped as required. After completion of each stripe, the slab is advanced the desired distance and again stopped for a time sufficient to complete the following stripe. Usually no more than three stripes are required for a slab and for shorter slabs two stripes may be sufficient. In any event, striping by the automatically controlled apparatus is accomplished quickly so that the striped slab can be removed from the striping station before the following slab is advanced from the cut-off machine.

Other features and advantages of the machine will be apparent from the detailed description contained hereinbelow, taken in conjunction with the drawings, in which:

FIG. 3 is a top plan view of the apparatus shown in FIG. 2;

DESCRIPTION OF THE PREFERRED EMBODIMENT

Figure 1:
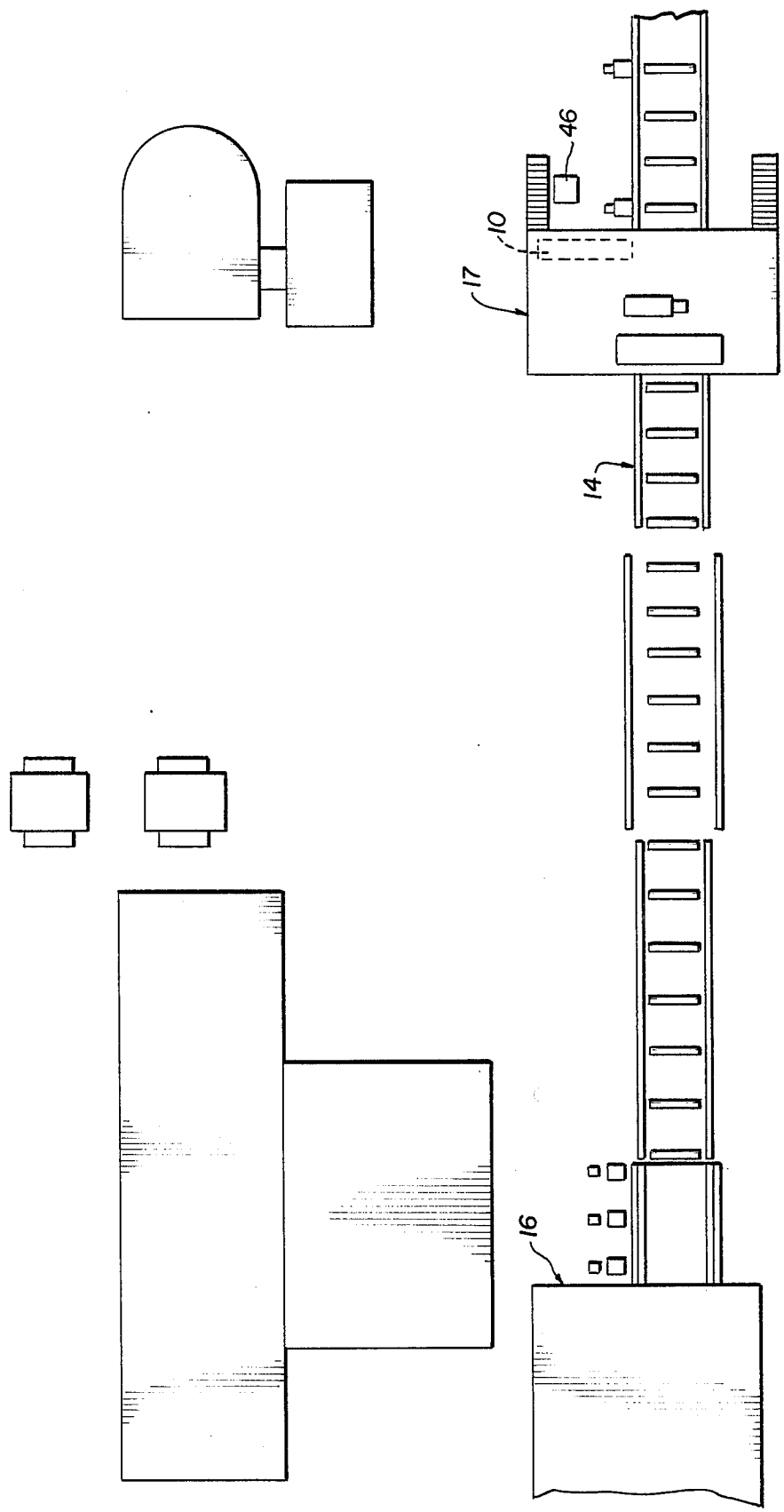
FIG. 1 is a plan view schematically illustrating the runout table portion of a continuous steel caster with which the present invention is used.

Referring now to the drawings in detail, the striping apparatus of the present invention, designated generally by the reference numeral 10, is particularly well adapted for use in striping steel slabs 12 supported on the runout table 14 of a continuous caster schematically illustrated at 16 in FIG. 1. As is known, steel is produced on such continuous casters by withdrawing a continuous strand from the open bottom of a fluid cooled mold. The strand is deflected from a generally vertical casting direction to a substantially horizontal position on a runout table as it cools and solidifies below the caster mold. The strand is then cut into slabs at a cutoff station (not shown) and the individual slabs are advanced on the runout table 14 past a weighing scale to a transfer mechanism which removes the individual slabs for further processing.

As previously stated, it has been the conventional practice to remove individual slabs which are to be striped from the runout table and hold them in a storage area where they are air cooled for from about 18 to about 36 hours as required to enable inspection and grading before being removed for further processing. This cooling makes it necessary to use considerable energy to reheat the large slabs before being further processed by hot rolling and also requires substantial storage area for the hot slabs.

In accordance with the present invention, when an individual slab 12 is cut from the continuous strand, it is accelerated on the runout table to provide a substantial distance between its trailing end and the leading end of the strand being cast. The automatic striping apparatus 10 of the present invention is located at one side of the runout table ahead of the weighing table, and each slab is stopped on the runout table at the desired locations relative to the striping apparatus for a time sufficient to complete each stripe. If the slab is to be striped at a plurality of locations, it is advanced after completion of each stripe to the next location and again stopped until that stripe is completed. Each slab may have two or three stripes scarfed in its top surface before being advanced to the weighing table and prior to the following slab being advanced to the striping and weighing stations. As in the prior art continuous casting apparatus, slab movement to the striping station is controlled by an operator in an operator's pulpit 17 above the runout table.

Figure 2:
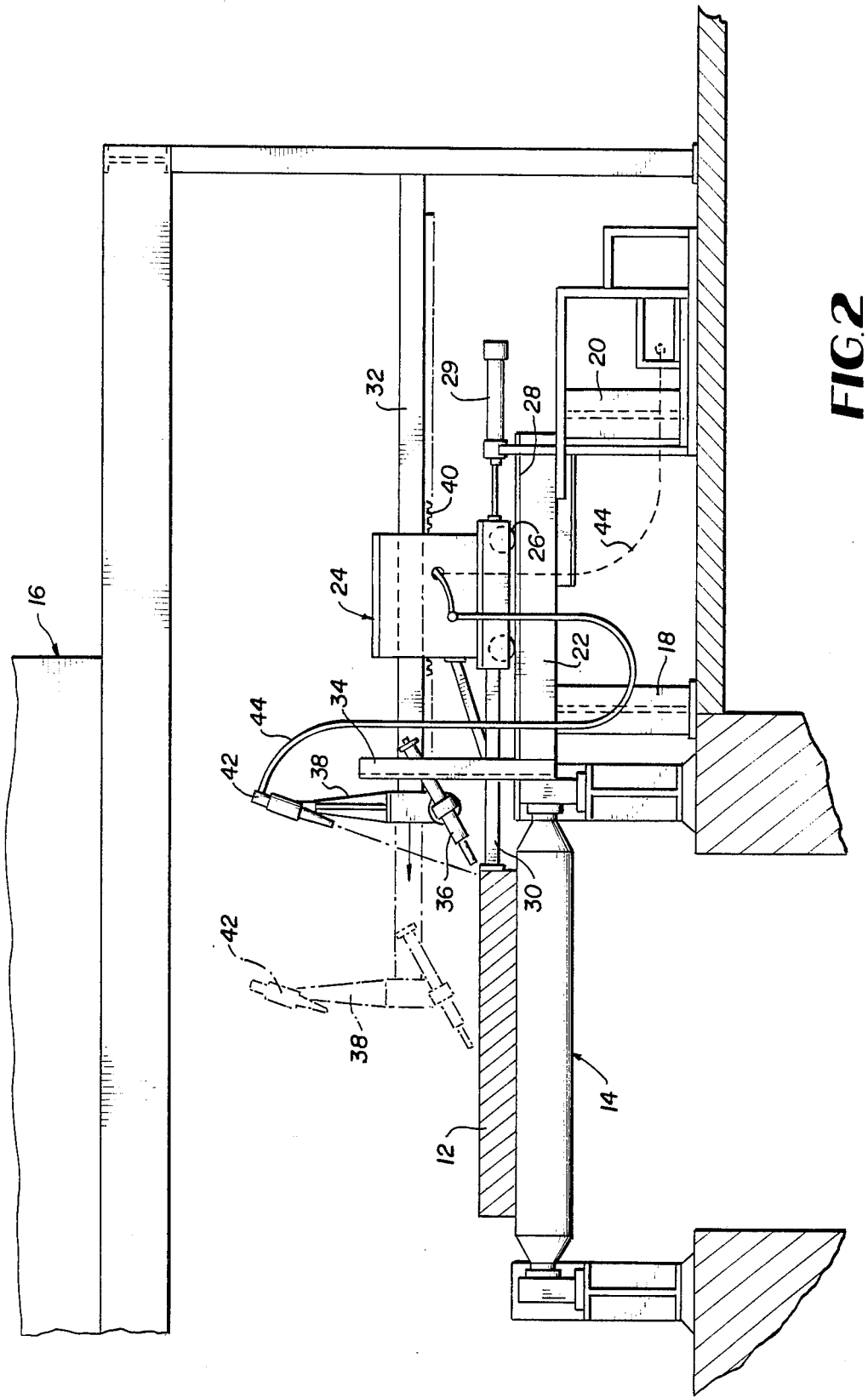
FIG. 2 is a side elevation view of the striping apparatus according to the present invention.

Referring now to FIGS. 2 and 3, the automatic striping apparatus of the present invention comprises a rigid frame including support columns 18, 20 adapted to be rigidly mounted to a floor surface adjacent runout table 14 and a horizontal platform 22 supported on columns 18, 20. A carriage 24 has wheels 26 supported on tracks 28 extending on the top of platform 22. Tracks 28 preferably extend perpendicular to the longitudinal axis of runout table 14 although obviously the tracks could extend at an angle other than 90° to such longitudinal axis. Fluid motor 29 connected between a bracket on platform 22 and carriage 24 is operable to drive the carriage along tracks 28 toward and away from a slab 12.

An arm 30 is mounted on carriage 24 and projects outwardly therefrom in position to engage the side edge of a slab 12 supported on the runout table adjacent the striping machine thereby accurately positioning carriage 24 relative to the slab. An elongated torch support beam 32 has its central portion movably mounted on carriage 24, with one end portion projecting through suitable support means, not shown, on a vertical stabilizer 34 rigidly mounted on and projecting upwardly from platform 22. An oxygen-gas scarfing torch 36 is supported on the end of beam 32 by a suitable bracket member 38. Motor means mounted in carriage 24 is operable to drive arm 32 in a longitudinally reciprocal path to move torch 36 across the top surface of the slab 12, with the end of the torch being in fixed vertically spaced relation to the slab. A rack 40 carried on beam 32 is adapted to be engaged by a pinion in a suitable gear reduction mechanism in carriage 24 to extend and retract the beam and torch across the surface of the slab.

An optical pyrometer 42 is mounted on bracket 38 at a location spaced above torch 36 and beam 32. Pyrometer 42 is adapted to be focused on the pool of molten metal moving ahead of torch 36 to continuously monitor the temperature and detect any changes produced when the torch flame and the molten pool of metal encounter an alumina inclusion. As is known, when such an inclusion is engaged during the striping operation, the alumina is rapidly reduced, producing a flash visible both to the naked eye and to the pyrometer 42.

Pyrometer 42 may be a commercially available Land System 3 radiation thermometer capable of detecting flashes produced by the reduction of alumina inclusions and to transmit a signal, through electrical cable 44, to a suitable microprocessor (not shown) at the operator's control station indicated generally at 46 in FIG. 3. Suitable conduits, also not shown, are provided to supply heating gas and scarfing oxygen to the torch 36, with the flow of gases to the torch being controlled from the operator's station as described hereinbelow.

Figure 5:
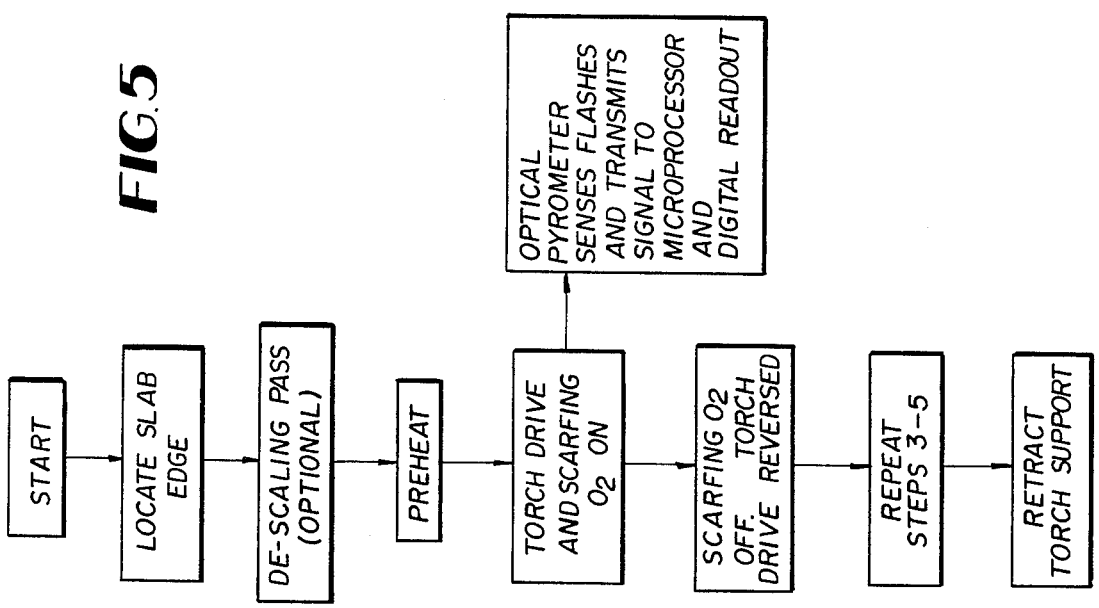
FIG. 5 is a block diagram schematically illustrating the operating sequence of the invention.
Figure 4:
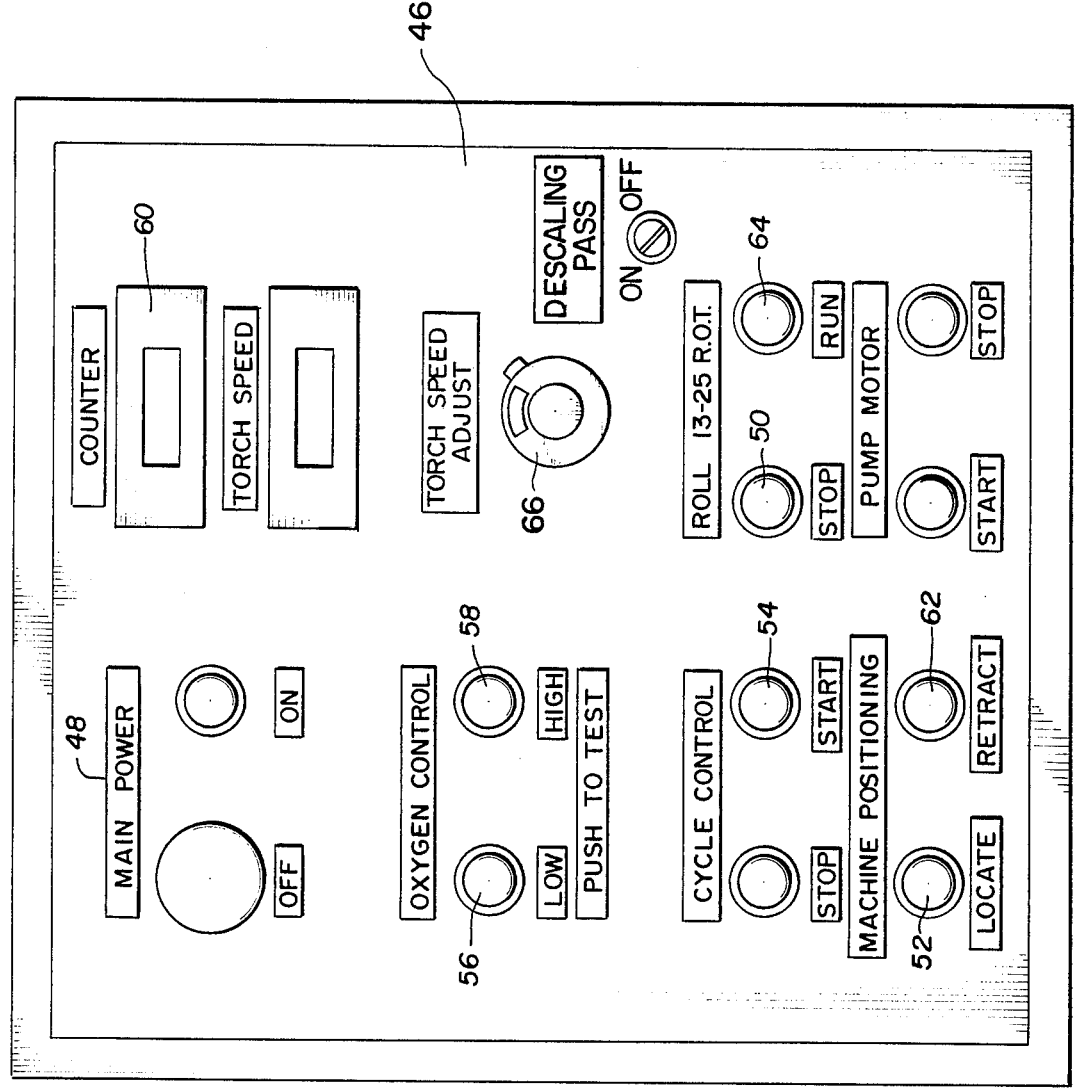
FIG. 4 is a layout view of the operator's control panel for the striping machine according to the present invention.

An operator at control station 46 controls positioning of a slab moving on the runout table and initiates the striping process which is then controlled by the microprocessor. Referring to FIGS. 4 and 5, and assuming the main power switch 48 is on, the operator stops the section of the runout table adjacent the striping machine by depressing ROT stop button 50 thereby positioning the slab at the desired location for the initial stripe. Carriage 24 is then advanced by the operator by depressing machine positioning locate button 52 to drive the carriage until the distal end of arm 30 engages the vertical side edge of slab 12. The cycle control start button 54 is then depressed and the microprocessor assumes control of the striping sequence and supplies preheat gas to torch 36 for a predetermined time to preheat the edge surface as well as during the optional descaling pass described below. In this respect, since slab 12 is still very hot following casting in the continuous caster, relatively little preheating time and energy is required.

After a predetermined time for preheating the surface of the slab, the microprocessor initiates the flow of scarfing oxygen to the torch and simultaneously actuates the drive motor to project support beam 32 across the slab to move torch 36 and optical pyrometer 42 in a straight path across the surface of the slab at a uniform rate. Flow of oxygen at a relatively low rate is indicated at the operator's station by an amber light 56 on the initial pass and by a red light 58 indicating a higher rate of flow on the second pass for reasons pointed out hereinbelow.

In practice of the invention, it has been found that excess scale on a hot slab surface can interfere with forming and maintaining the molten metal pool which moves ahead of the torch during striping. This is particularly true for steels which have a tendency to form heavy scale very quickly following casting. To overcome this problem, an optional descaling pass may be initially made with the torch to blow off such excessive scale. When the descaling mode of operation is selected by the operator, movement of the torch across the slab is commenced immediately upon the torch being positioned adjacent the slab edge surface, i.e., without the delay to preheat the slab surface as required before commencing a striping pass. Also, during the descaling pass, only preheat gasses are supplied to the torch so that no scarfing or melting of metal occurs.

During the optional descaling pass, the heat and velocity of the gasses in the flame loosen and dislodge heavy scale layers to leave a substantially clean metal surface for the initial striping pass. Preferably preheating gas is continuously supplied to the torch as the torch is returned across the same path and positioned adjacent the edge of the slab to immediately commence slab preheating prior to the initial striping pass.

The width of the slab being striped is known and provided to the microprocessor which stops the flow of oxygen when the full width of the slab has been traversed and at the same time reverses the drive mechanism in carriage 24 to retract the beam 32. Alternatively, switch means may be provided in position to be actuated to retract the beam when it has traversed the slab surface. When the torch has been fully retracted, the beam is stopped for a predetermined time while the slab is preheated for a predetermined time before scarfing oxygen is again turned on and a second pass of the torch is made to scarf a second stripe in exact overlying relation with the initial stripe.

As indicated above, the initial striping pass is preferably commenced a short distance from the edge of the top slab surface, and the second striping pass is commenced at a point closer to the slab edge to avoid overlapping of any slight gouge which might occur at the start of the striping passes. During the second striping pass, the torch is maintained at the same distance above the slab and the oxygen flow level is increased to compensate for the additional height of the torch relative to the surface being striped. The higher oxygen flow rate on the second pass is indicated by light 58.

During the striping process, flashes observed by the pyrometer 42 are counted by a suitable counting mechanism and displayed on a digital readout 60 at the operator's station. The substantially instantaneous temperature rises resulting from rapid reduction of alumina particles produce variations in the optical pyrometer output voltage signal transmitted to the microprocessor. The microprocessor converts the signal variation to electrical impulses which are counted by counter 60, which may be a commercially available Veeder-Root counter, and recorded or entered into other processor control equipment for future use or to form a permanent part of the slab history.

Once the second striping pass has been completed and the arm 32 retracted, the microprocessor controller reverses and retracts arm 30 from contact with the slab and the operator then depresses ROT run switch 64 to energize the runout table drive motors to advance the slab to the next striping station or to remove the striped slab from the striping station as appropriate. In an alternative operational mode, retraction of the carriage 24 and arm 32 may be controlled by the operator by depressing retract button 62.

Control means 66 preferably is provided to adjust the torch drive speed to compensate for any slight variations in torch position relative to the slab surface, variations in oxygen pressure, and changes in temperature of the slab being striped whereby optimum striping results are achieved.

It is apparent that the present invention eliminates to the maximum extent practical the potential for human error in a striping operation. Further, use of the optical pyrometer may be substantially more sensitive and can be accurately focused continuously on the precise area desired. In this regard, it has been found that the pyrometer should be focused on the area near the leading edge of the molten puddle of metal created by the striping torch, and testing has shown that accurate focusing is critical to operation of the apparatus to pick up all flashes as they occur.

While a preferred embodiment of the invention has been described in detail, it should be apparent that the invention is not so limited and it is therefore intended to include all embodiments which would be apparent to one skilled in the art and which come within the spirit and scope of the invention.

What is claimed is:

1. A method of striping a steel slab cast in a continuous caster comprising, stopping the slab at a striping station on the runout table of the continuous caster, supporting a scarfing torch for movement along a predetermined path across the slab surface to be striped, providing a supply of preheating gas and scarfing oxygen to the torch, initially positioning and retaining said scarfing torch adjacent one side edge of the slab to be striped while supplying preheating gas only to the torch for a time sufficient to preheat an area of the slab surface adjacent the torch prior to supplying scarfing oxygen to the torch and thereafter moving the scarfing torch in a first striping pass along said predetermined path while supplying both preheating gas and scarfing oxygen to the torch to scarf a first layer from the slab surface, providing an optical pyrometer and moving the optical pyrometer with the scarfing torch to continuously monitor the removal of the first layer to detect flash temperature increases produced by rapid reduction of alumina inclusions in said first layer being removed, retracting said scarfing torch along said predetermined path while supplying preheating gas only to the torch, moving the scarfing torch and optical pyrometer in a second striping pass along said predetermined path while supplying preheating gas and scarfing oxygen to the torch to scarf a second layer of metal from the slab and to continuously monitor the removal of said second layer by said optical pyrometer to detect flash temperature increases produced by the rapid reduction of alumina inclusions in said second layer being removed, producing an electrical signal by said optical pyrometer in response to each such flash temperature increase detected, operatively connecting said optical pyrometer to a microprocessor, utilizing the microprocessor to count the electrical signals and provide a record of the flash temperature increases detected by the radiation thermometer during each pass of the scarfing torch along said predetermined path and compare the number of flash temperature increases detected on the first and second pass, and utilizing said microprocessor to control movement and operation of said scarfing torch during said first and second striping passes along said predetermined path.

2. The method defined in claim 1 wherein said scarfing torch is maintained at the same distance from said slab surface during said first and second striping passes, and wherein an increased flow of oxygen is provided to the scarfing torch during the second pass to compensate for the increased distance from the torch to the area being scarfed as a result of removal of the first layer.

3. The method defined in claim 2 further comprising the step of supplying preheating gas only to the torch and moving said torch along said predetermined path across said slab surface to remove scale from the slab surface in the area to be striped prior to the first striping pass.

* * * * *